United States Patent
Park

(10) Patent No.: US 12,451,719 B2
(45) Date of Patent: Oct. 21, 2025

(54) BATTERY PACK, BATTERY SYSTEM AND PRECHARGE METHOD

(71) Applicant: LG ENERGY SOLUTION, LTD., Seoul (KR)

(72) Inventor: Mi-So Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 557 days.

(21) Appl. No.: 17/919,702

(22) PCT Filed: Oct. 5, 2021

(86) PCT No.: PCT/KR2021/013638
§ 371 (c)(1),
(2) Date: Oct. 18, 2022

(87) PCT Pub. No.: WO2022/075712
PCT Pub. Date: Apr. 14, 2022

(65) Prior Publication Data
US 2023/0144351 A1    May 11, 2023

(30) Foreign Application Priority Data
Oct. 6, 2020 (KR) .................. 10-2020-0128999

(51) Int. Cl.
*H02J 7/34* (2006.01)
*H01M 10/42* (2006.01)
(Continued)

(52) U.S. Cl.
CPC ......... *H02J 7/345* (2013.01); *H01M 10/4264* (2013.01); *H01M 10/46* (2013.01);
(Continued)

(58) Field of Classification Search
CPC ....................................................... H02J 7/345
(Continued)

(56) References Cited

U.S. PATENT DOCUMENTS

2010/0080022 A1    4/2010 Schmidt
2011/0304299 A1*  12/2011 Yang ................. H02J 7/007182
                                                      320/162
(Continued)

FOREIGN PATENT DOCUMENTS

CN    109818393 A    5/2019
EP    2 822 132 A1    1/2015
(Continued)

OTHER PUBLICATIONS

International Search Report for PCT/KR2021/013638 (PCT/ISA/210) mailed on Jan. 24, 2022.
(Continued)

*Primary Examiner* — Yalkew Fantu
(74) *Attorney, Agent, or Firm* — Birch, Stewart, Kolasch & Birch, LLP

(57) ABSTRACT

A battery pack includes a battery cell, a main relay provided on a charging and discharging path of the battery cell, a precharge relay, a precharge resistor, the precharge relay and the precharge resistor being connected in parallel to the main relay on the charging and discharging path, a connector connected to a load including a capacitor; a communication part receiving a capacitance of the capacitor from the load through the connector, when the load is connected to the connector, and a controller obtaining the capacitance from the communication part, calculating a duty ratio corresponding to the capacitance, and precharging the capacitor by controlling an operation state of the precharge relay according to the calculated duty ratio.

10 Claims, 3 Drawing Sheets

(51) Int. Cl.
  *H01M 10/46* (2006.01)
  *H02J 7/00* (2006.01)

(52) U.S. Cl.
  CPC ........ *H02J 7/00032* (2020.01); *H02J 7/0036* (2013.01); *H02J 7/0063* (2013.01); *H02J 2207/50* (2020.01)

(58) Field of Classification Search
  USPC ........................................................ 320/166
  See application file for complete search history.

(56) References Cited

U.S. PATENT DOCUMENTS

| | | |
|---|---|---|
| 2014/0028088 A1 | 1/2014 | Salziger et al. |
| 2014/0125290 A1 | 5/2014 | Kim et al. |
| 2016/0152156 A1 | 6/2016 | Pritelli et al. |
| 2016/0241051 A1* | 8/2016 | Yang ..................... H01M 10/46 |
| 2016/0282392 A1 | 9/2016 | Lee et al. |
| 2018/0123491 A1 | 5/2018 | Jo et al. |
| 2020/0039365 A1 | 2/2020 | Chang et al. |
| 2020/0144832 A1 | 5/2020 | Kim |
| 2020/0185954 A1 | 6/2020 | Song et al. |
| 2020/0235586 A1 | 7/2020 | Yang et al. |
| 2020/0244075 A1* | 7/2020 | Park ................... H01M 10/425 |

FOREIGN PATENT DOCUMENTS

| | | |
|---|---|---|
| JP | 2005-295697 A | 10/2005 |
| JP | 2012-19640 A | 1/2012 |
| JP | 2013-179760 A | 9/2013 |
| JP | 6053206 B2 | 12/2016 |
| KR | 10-0739942 B1 | 7/2007 |
| KR | 10-1164757 B1 | 7/2012 |
| KR | 10-1605990 B1 | 3/2016 |
| KR | 10-2017-0002298 A | 1/2017 |
| KR | 10-2017-0012794 A | 2/2017 |
| KR | 10-1780396 B1 | 9/2017 |
| KR | 10-2018-0113856 A | 10/2018 |
| KR | 10-2019-0073925 A | 6/2019 |
| KR | 10-2019-0098532 A | 8/2019 |
| KR | 10-2019-0128281 A | 11/2019 |

OTHER PUBLICATIONS

Extended European Search Report dated Oct. 27, 2023 for Application No. 21877963.5.

* cited by examiner

BATTERY PACK, BATTERY SYSTEM AND PRECHARGE METHOD

TECHNICAL FIELD

The present application claims priority to Korean Patent Application No. 10-2020-0128999 filed on Oct. 6, 2020 in the Republic of Korea, the disclosures of which are incorporated herein by reference.

The present disclosure relates to a battery pack, a battery system and a precharge method, and more particularly, to a battery pack, a battery system and a precharge method, which may accurately perform precharging by obtaining a capacitance of a capacitor at a load.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

Conventionally, a precharge circuit is configured in parallel inside the battery pack, and before the capacitor of the battery and the load is connected to a main relay, the voltage is charged to the capacitor through the precharge circuit, and then the main relay is connected to prevent an excessive current caused by a voltage difference, thereby preventing an arc from occurring.

However, in order to perform the precharge, it is required to acquire the capacitance of the capacitor. Conventionally, the specifications of the load that can be connected to the battery pack are set in advance, so the capacitance of the capacitor could be known in advance. Alternatively, conventionally, the battery pack or the load directly measures the capacitance of the capacitor, thereby checking the capacitance at the battery pack.

That is, conventionally, there is a problem that it is compatible only with a load whose capacitance is known in advance, and there is a problem that a measurement module for directly measuring the capacitance must be provided.

DISCLOSURE

Technical Problem

The present disclosure is designed to solve the problems of the related art, and therefore the present disclosure is directed to providing a battery pack, a battery system and a precharge method, which receives a capacitance of a capacitor from a load before performing the precharge to obtain the capacitance and performs the precharge according to a duty ratio calculated based on the obtained capacitance.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery pack according to one aspect of the present disclosure is a battery pack including a battery cell, a main relay provided on a charging and discharging path of the battery cell, a precharge relay, a precharge resistor, the precharge relay and the precharge resistor being connected in parallel to the main relay on the charging and discharging path, a connector connected to a load including a capacitor; a communication part configured to receive a capacitance of the capacitor from the load through the connector, when the load is connected to the connector, and a controller configured to obtain the capacitance from the communication part, calculate a duty ratio corresponding to the capacitance, and precharge the capacitor by controlling an operation state of the precharge relay according to the calculated duty ratio.

A battery pack according to another aspect of the present disclosure may further comprise a storage part configured to map and store identification information of the load and the capacitance.

The communication part may be configured to further receive the identification information together with the capacitance from the load.

The controller may be further configured to obtain the identification information and the capacitance received by the communication part, and determine whether to store the identification information and the obtained capacitance by comparing the obtained identification information with the identification information.

The controller may be further configured to map and store the obtained identification information and the obtained capacitance in the storage part, when the obtained identification information is not stored in the storage part.

When the obtained identification information is stored in the storage part but the obtained capacitance is different from the capacitance stored in the storage part, the controller may be further configured to update the stored capacitance to the obtained capacitance to correspond to the stored identification information.

The main relay may be configured to have a first end connected to a first end of the battery cell and a second end connected to the connector.

The precharge relay may be configured to have a first end connected between the first end of the battery cell and the first end of the main relay on the charging and discharging path and a second end connected to a first end of the precharge resistor.

The precharge resistor may be configured to the first end connected to the other end of the precharge relay and a second end connected between a second end of the main relay and the connector on the charging and discharging path.

A battery system according to still another aspect of the present disclosure may comprise the battery pack according to one aspect of the present disclosure; and the load.

The capacitor includes a first end connected to a positive electrode terminal of the battery pack and a second end connected to a negative electrode terminal of the battery pack; a communication unit communicatively connected to the communication part; and a control unit configured to control the communication unit to output the capacitance of the capacitor and the identification information of the load to the communication part.

A battery pack according to still another aspect of the present disclosure may further include a connection detector configured to detect a connection between the load and the connector and output a connection detection signal when the connection between the load and the connector is detected.

The controller may be further configured to output a request signal for requesting the capacitance of the capacitor and the identification information of the load to the communication unit through the communication part, when the connection detection signal is received from the connection detector.

The control unit may be further configured to receive the request signal through the communication unit, generate a response signal including the identification information and the capacitance in response to the request signal, and control the communication unit to output the response signal to the communication part.

The load may further include a connection detection unit configured to detect a connection to the connector and output a connection signal to the control unit when the connection to the connector is detected.

The control unit may be further configured to control the communication unit to output the capacitance and the identification information to the communication part, when the connection signal is received from the connection detection unit.

A precharge method according to still another aspect of the present disclosure is a precharge method of a battery pack including a battery cell, a main relay provided on a charging and discharging path of the battery cell, and a precharge relay and a precharge resistor connected in parallel to the main relay on the charging and discharging path and is configured to be connected to a load including a capacitor, and the precharge method may comprise: a capacitance receiving step of receiving a capacitance of the capacitor from the load, when the battery pack and the load are connected; a duty ratio calculating step of calculating a duty ratio corresponding to the capacitance; and a precharging step of precharging the capacitor by controlling an operation state of the precharge relay according to the calculated duty ratio.

Advantageous Effects

According to one aspect of the present disclosure, there is an advantage in that capacitance information of the capacitor is received and obtained from the load in advance before performing the precharge, and then the precharge may be performed based on the obtained capacitance.

The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "controller" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
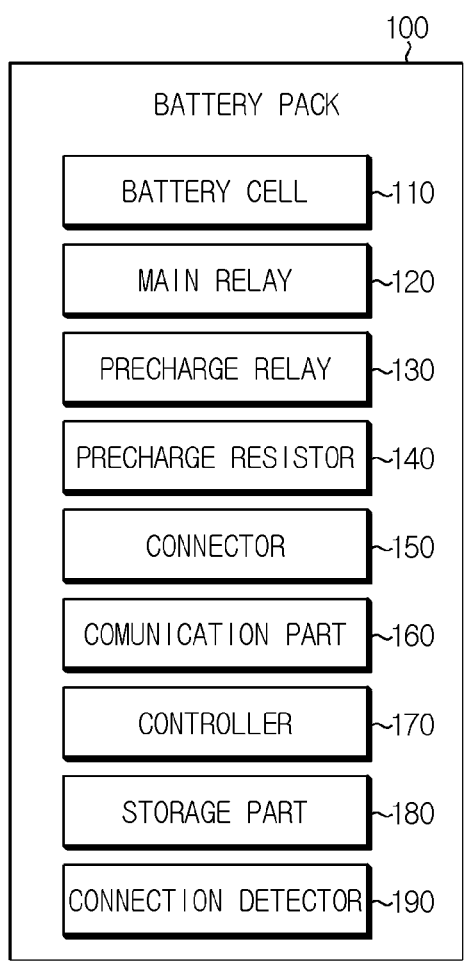
FIG. 1 is a diagram schematically showing a battery pack according to an embodiment of the present disclosure.
Figure 2:
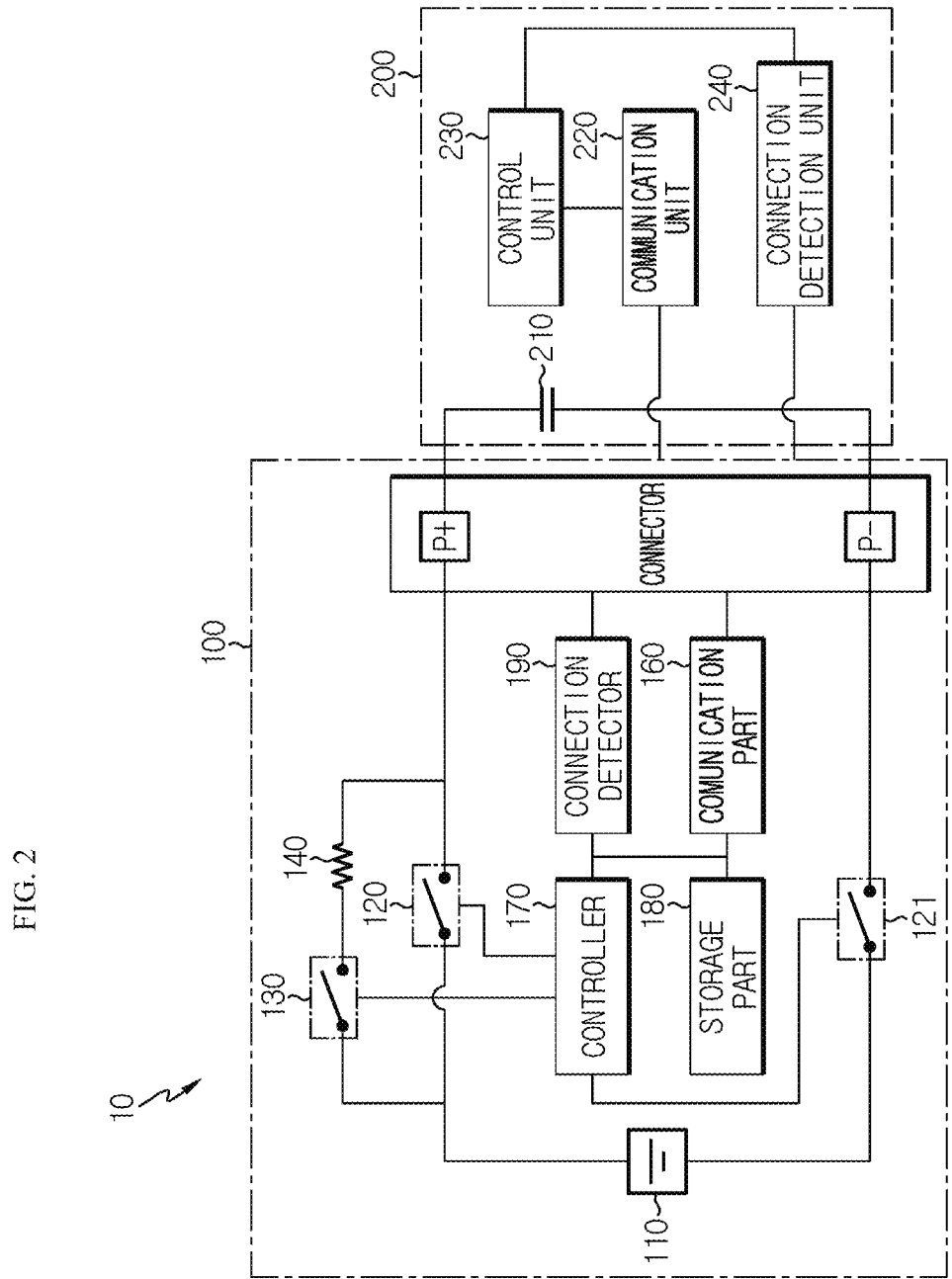
FIG. 2 is a diagram schematically showing an exemplary configuration of the battery pack according to an embodiment of the present disclosure and a load.

FIG. 1 is a diagram schematically showing a battery pack 100 according to an embodiment of the present disclosure. FIG. 2 is a diagram schematically showing an exemplary configuration of the battery pack 100 according to an embodiment of the present disclosure and a load 200.

Referring to FIG. 1, the battery pack 100 according to an embodiment of the present disclosure may include a battery cell 110, a main relay 120, a precharge relay 130, a precharge resistor 140, a connector 150, a communication part 160, and a controller 170.

Here, the battery cell 110 refers to one physically separable independent cell including a negative electrode terminal and a positive electrode terminal. For example, one pouch-type lithium polymer cell may be regarded as the battery cell 110.

Specifically, the battery pack 100 includes at least one battery cell 110, a main relay 120 provided on a charging and discharging path L of the battery cell 110, and a precharge relay 130 and a precharge resistor 140 connected in parallel to the main relay 120 on the charging and discharging path L.

The main relay 120 may be configured to have one end connected to one end of the battery cell 110 and the other end connected to the connector 150.

For example, in the embodiment of FIG. 2, the main relay 120 may be provided on the charging and discharging path L. Here, the charging and discharging path L is a current path provided inside the battery pack 100, and may be a high current path that connects a positive electrode terminal P+ of the battery pack 100, the battery cell 110, and a negative electrode terminal P− of the battery pack 100. One end of the main relay 120 may be connected to the positive electrode of the battery cell 110, and the other end of the main relay 120 may be connected to the positive electrode terminal P+ of the battery pack 100.

In addition, in the embodiment of FIG. 2, a second main relay 121 may be provided between the negative electrode of the battery cell 110 and the negative electrode terminal P− of the battery pack 100. That is, the main relay 120 may be provided at the positive electrode of the battery cell 110, and the second main relay 121 may be provided at the negative electrode of the battery cell 110.

The precharge relay 130 may be configured to have one end connected between one end of the battery cell 110 and one end of the main relay 120 on the charging and discharging path L and the other end connected to one end of the precharge resistor 140.

The precharge resistor 140 is configured to have one end connected to the other end of the precharge relay 130 and the other end connected between the other end of the main relay 120 and the connector 150 on the charging and discharging path L.

That is, the precharge relay 130 and the precharge resistor 140 may be connected in series with each other, and may be connected in parallel with the main relay 120 on the charging and discharging path L.

The connector 150 may be configured to allow a load 200 including a capacitor 210 to be connected thereto. Specifically, the connector 150 may include a positive electrode terminal P+ of the battery pack 100 and a negative electrode terminal P− of the battery pack 100.

For example, in the embodiment of FIG. 2, the positive electrode terminal P+ and the negative electrode terminal P− of the battery pack 100 may be included in the connector 150. In addition, since the load 200 is connected to the connector 150, the battery pack 100 and the load 200 may be connected to each other.

The communication part 160 may be configured to receive a capacitance of the capacitor 210 from the load 200 through the connector 150, when the load 200 is connected to the connector 150.

For example, the communication part 160 may communicate with the load 200 by wire and/or wirelessly. The embodiment of FIG. 2 may be an embodiment in which the communication part 160 communicates with the load 200 through a wired line. That is, in the embodiment of FIG. 2, the communication part 160 may be connected to the connector 150 and connected to the load 200 through the connector 150 by wire. Through the wired line, the communication part 160 may receive the capacitance from the load 200.

The controller 170 may be configured to obtain the capacitance from the communication part 160.

Preferably, the controller 170 and the communication part 160 may be connected to communicate with each other.

When the communication part 160 receives the capacitance from the load 200, the controller 170 may obtain the capacitance from the communication part 160.

Also, the controller 170 may be configured to calculate a duty ratio corresponding to the capacitance. In addition, the controller 170 may be configured to precharge the capacitor 210 by controlling the operation state of the precharge relay 130 according to the calculated duty ratio.

Here, the duty ratio may be an ON/OFF ratio for controlling the operation state of the precharge relay 130. Specifically, the controller 170 may alternately control the operation state of the precharge relay 130 to a turn-on state or a turn-off state according to the calculated duty ratio. Through this process, the capacitor 210 included in the load 200 is charged, thereby completing the precharge.

Meanwhile, in the embodiment of FIG. 2, while the precharge is in progress, the operation state of the main relay 120 may be a turn-off state, and the operation state of the second main relay 121 may be a turn-on state. In addition, the operation state of the precharge relay 130 may be controlled according to the duty ratio calculated by the controller 170.

In general, for the precharge, the capacitance of the capacitor 210 included in the load 200 may be known in advance or may be checked by directly measuring the capacitance. In other words, since the capacitor 210 may be charged as much as the voltage corresponding to the capacitance only when the capacitance of the capacitor 210 of the load 200 is checked, it is most important to check the capacitance before performing the precharge in order to accurately perform the precharge.

However, it is practically impossible to know the capacitance of various types of loads 200 that can be connected to the battery pack 100 in advance. Also, it can be inefficient to measure the capacitance of the load 200 every time for the precharge in that the capacitance measurement module is forced.

For example, when the battery pack 100 is used for home use, various products may be connected to the battery pack 100. In addition, these various products may include capacitors 210 having different capacitances according to specifications. In this case, the capacitance of some of the various products may not be set in advance in the controller 170, and the controller 170 may precharge the product by setting an incorrect duty ratio. If the precharge is insufficiently performed, a ripple current may be generated to damage an element included in the battery pack 100 and/or an internal element of the load 200.

Therefore, the battery pack 100 according to an embodiment of the present disclosure has an advantage of receiving and obtaining capacitance information of the capacitor 210 from the load 200 in advance before performing the precharge, and then performing the precharge based on the obtained capacitance.

In other words, since the battery pack 100 according to an embodiment of the present disclosure may perform accurate precharge to correspond to the capacity of the capacitor 210 after receiving and obtaining the capacitance from the load 200 in advance, there is an advantage of having excellent versatility and compatibility for various products that can be charged with the battery pack 100.

Meanwhile, the controller 170 provided to the battery pack 100 according to an embodiment of the present disclosure may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the controller 170 may be implemented as a set of program modules. At this time, the program module may be stored in a memory and executed by the controller 170. The memory may be located inside or out of the controller 170 and may be connected to the controller 170 by various well-known means.

Referring to FIGS. 1 and 2, the battery pack 100 according to an embodiment of the present disclosure may further include a storage part 180.

The storage part 180 may be configured to map and store identification information of the load 200 and the capacitance.

That is, in the storage part 180, the identification information of the load 200 and the capacitance of the load 200 may be mapped and stored. For example, the capacitance of the load 200 may be checked through the identification information of the load 200 stored in the storage part 180.

The communication part 160 may be configured to further receive the identification information together with the capacitance from the load 200. That is, the identification information of the load 200 stored in the storage part 180 may be received by the communication part 160 from the load 200.

For example, when the communication part 160 receives the identification information and the capacitance from the load 200, the storage part 180 may map and store the identification information and the capacitance received by the communication part 160.

In addition, the storage part 180 may store programs and data required for the controller 170. That is, the storage part 180 may store data necessary for operation and function of each component of the battery pack 100, data generated in the process of performing the operation or function, or the like. The storage part 130 is not particularly limited in its kind as long as it is a known information storage means that can record, erase, update and read data. As an example, the information storage means may include RAM, flash memory, ROM, EEPROM, registers, and the like. In addition, the storage part 180 may store program codes in which processes executable by the controller 170 are defined.

Meanwhile, the controller 170 may be configured to control the output power according to the battery cell 110 based on the capacitance received by the communication part 160 after the precharge of the capacitor 210 is completed.

Preferably, a power profile representing a correspondence between the capacitance of the capacitor 210 that may be included in the load 200 and the output power of the battery pack 100 may be preset. This power profile is configured to be used to determine the optimal output power corresponding to the capacitance of the capacitor 210 included in the load, and may be stored in advance in the storage part 180.

If the capacitance of the capacitor 210 included in the load 200 is not preset in the controller 170, the optimal output power for the load 200 may not be determined. That is, since the capacitance of the capacitor 210 included in the load 200 is not accurately recognized, the optimal output power for the load 200 may not be determined even when the power profile is considered. In this case, since the output power of the battery pack 100 is not controlled to the optimum output power, when the load 200 is charged by the battery pack 100, a ripple current or a reverse voltage may be applied.

For example, when various products can be connected to the battery pack 100, charging by the battery pack 100 may be unstable because the optimal output power is not determined even if the power profile is considered for a product whose capacitance is not preset.

Therefore, the battery pack 100 according to an embodiment of the present disclosure has an advantage of outputting power optimized to the load 200 based on the capacitance as well as performing precharge based on the capacitance directly received from the load 200. That is, the battery pack 100 according to an embodiment of the present disclosure has an advantage of charging the load 200 stably.

The controller 170 may be configured to obtain the identification information and the capacitance received by the communication part 160.

For example, in the embodiment of FIG. 2, the controller 170 may obtain both the identification information and the capacitance received by the communication part 160 from the load 200.

In addition, the controller 170 may be configured to compare the obtained identification information with the identification information stored in the storage part 180 to determine whether to store the identification information and the obtained capacitance.

Specifically, when the obtained identification information is not stored in the storage part 180, the controller 170 may be configured to map the obtained identification information and the obtained capacitance and store the same in the storage part 180.

For example, when a new product (hereinafter, a first load) is connected to the battery pack 100, identification information and capacitance for the first load may not be stored in the storage part 180. The communication part 160 may receive the identification information of the first load and the capacitance of the capacitor 210 included in the first load from the first load. The controller 170 may map and store the first identification information of the first load and the first capacitance received by the communication part 160 in the storage part 180. Thereafter, the controller 170 may set a first duty ratio corresponding to the first load based on the first capacitance of the first load. In addition, the controller 170 may precharge the capacitor 210 included in the first load by controlling the operation state of the precharge relay 130 according to the set first duty ratio.

Also, when the obtained identification information is stored in the storage part 180 but the obtained capacitance is different from the capacitance stored in the storage part 180, the controller 170 may be configured to update the stored capacitance to the obtained capacitance to correspond to the stored identification information.

For example, although the same product (hereinafter referred to as a second load) as a product that has already been connected to the battery pack 100 is connected again, the capacitor 210 may be changed because the second load is repaired or changed. Alternatively, although the product is the same as a product that has already been connected to the battery pack 100, the second load whose capacitor 210 is changed may be connected to the battery pack 100 as the manufacturing specifications are changed.

In this case, the storage part 180 may store identification information and capacitance for a product that has already been connected. That is, even though second identification information of the second load received by the communication part 160 from the second load is the same as the identification information already stored in the storage part 180, the second capacitance of the second load received by the communication part 160 may be different from the capacitance already stored in the storage part 180. Accordingly, the controller 170 may obtain the second identification information and the second capacitance of the second load from the communication part 160, and update the capacitance corresponding to the identification information of the second load stored in the storage part 180 to the newly obtained second capacitance. Thereafter, the controller 170 may set a second duty ratio corresponding to the second load based on the updated second capacitance of the second load. In addition, the controller 170 may precharge the capacitor 210 included in the second load by controlling the operation state of the precharge relay 130 according to the set second duty ratio.

Figure 3:
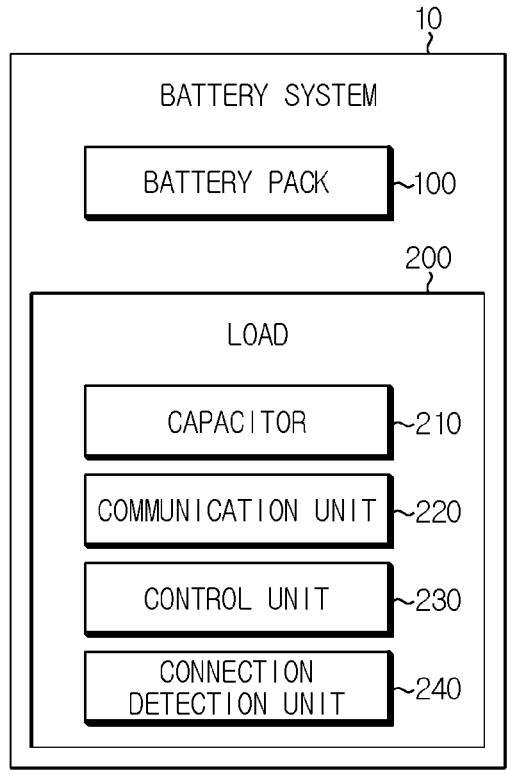
FIG. 3 is a diagram schematically showing a battery system according to another embodiment of the present disclosure.

FIG. 3 is a diagram schematically showing a battery system 10 according to another embodiment of the present disclosure.

Referring to FIG. 3, the battery system 10 according to another embodiment of the present disclosure may include the battery pack 100 according to an embodiment of the present disclosure and a load 200.

In addition, the load 200 may include a capacitor 210, a communication unit 220, and a control unit 230.

The capacitor 210 may be configured to have one end connected to the positive electrode terminal P+ of the battery pack 100 and the other end connected to the negative electrode terminal P− of the battery pack 100.

For example, in the embodiment of FIG. 2, one end of the capacitor 210 may be connected to the positive electrode terminal P+ of the battery pack 100 by being connected to the connector 150. Also, the other end of the capacitor 210 may be connected to the negative electrode terminal P− of the battery pack 100 by being connected to the connector 150. Accordingly, when the capacitor 210 is connected to the connector, a closed circuit connecting the positive electrode terminal P+ of the battery pack 100, the battery cell 110, the negative electrode terminal P− of the battery pack 100, and the capacitor 210 may be formed.

The communication unit 220 may be configured to be communicatively connected to the communication part 160.

The communication unit 220 may be configured to communicate with the communication part 160 by wire and/or wirelessly.

For example, in the embodiment of FIG. 2, the communication unit 220 may be communicatively connected to the communication part 160 through a wired line. The communication unit 220 may be connected to the connector 150 and may be connected to the communication part 160 by wire through the connector 150.

The control unit 230 may be configured to control the communication unit 220 to output the capacitance of the capacitor 210 and the identification information of the load 200 to the communication part 160.

Referring to FIGS. 1 and 2, the battery pack 100 may further include a connection detector 190.

The connection detector 190 may be configured to detect a connection between the load 200 and the connector 150, and output a connection detection signal when the connection between the load 200 and the connector 150 is detected.

Preferably, the connection detector 190 may detect whether the positive electrode terminal P+ and the negative electrode terminal P− of the battery pack 100 are connected to the capacitor 210. In addition, the connection detection signal output by the connection detector 190 may be output to the controller 170.

Upon receiving the connection detection signal from the connection detector 190, the controller 170 may be configured to output a request signal for requesting the capacitance of the capacitor 210 and the identification information of the load 200 to the communication unit 220 through the communication part 160.

Specifically, when receiving the connection detection signal from the connection detector 190, the controller 170 may determine that the battery pack 100 and the load 200 are connected. In addition, when the battery pack 100 and the load 200 are connected, the communication part 160 of the battery pack 100 and the communication unit 220 of the load 200 may be connected to communicate with each other. Accordingly, the controller 170 may control the communication part 160 to output a request signal for requesting the identification information and the capacitance to the communication unit 220.

That is, the controller 170 may obtain the capacitance by outputting the request signal to the load 200 before performing the precharge (when the battery pack 100 and the load 200 are connected) in order to accurately perform the precharge. In addition, the controller 170 may set a duty ratio corresponding to the obtained capacitance and perform precharge according to the set duty ratio.

Therefore, the battery system 10 according to another embodiment of the present disclosure has an advantage of preventing unexpected problems that may occur due to incompletely performed precharge in advance by obtaining the capacitance information first and then performing precharge to correspond to the obtained capacitance.

The control unit 230 may be configured to receive the request signal through the communication unit 220.

For example, in the previous embodiment, when the controller 170 of the battery pack 100 receives the connection detection signal from the connection detector 190, it may output a request signal for requesting the identification information of the load 200 and the capacitance. In addition, the control unit 230 of the load 200 may receive the request signal through the communication unit 220.

The control unit 230 may be configured to generate a response signal including the identification information and the capacitance in response to the request signal, and to control the communication unit 220 to output the response signal to the communication part 160.

Specifically, the control unit 230 may generate a response signal including the identification information of the load 200 and the capacitance of the capacitor 210 included in the load 200. That is, the response signal generated by the control unit 230 may correspond to the request signal generated by the controller 170. The control unit 230 may output the generated response signal through the communication unit 220. The response signal output through the communication unit 220 may be received by the controller 170 through the communication part 160.

Referring to FIGS. 2 and 3, the load 200 may further include a connection detection unit 240.

The connection detection unit 240 may be configured to detect a connection to the connector 150, and to output a connection signal to the control unit 230 when the connection to the connector 150 is detected.

That is, the connection detection unit 240 provided in the load 200 may have a configuration corresponding to the connection detector 190 provided in the battery pack 100.

The control unit 230 may be configured to control the communication unit 220 to output the capacitance and the identification information to the communication part 160, when receiving the connection signal from the connection detection unit 240.

That is, the control unit 230 may output the capacitance and the identification information not only when the response signal is received through the communication unit 220 but also when the connection signal is received from the connection detection unit 240.

For example, the connection detector 190 may not determine whether the battery pack 100 and the load 200 are connected since a defect occurs in the connection detector 190 provided in the battery pack 100. In this case, if the control unit 230 can output the response signal only when receiving the request signal, precharge may not proceed or may be performed incorrectly. Accordingly, the load 200 may further include the connection detection unit 240 to determine whether the battery pack 100 and the load 200 are connected, and the control unit 230 may output the capacitance and the identification information through the communication unit 220 based on the connection signal.

Preferably, when both the connection detector 190 and the connection detection unit 240 operate normally, in order to prevent interference between the request signal output by the communication part 160 and the signal output by the communication unit 220, the control unit 230 may output the capacitance and the identification information through the communication unit 220 after a predetermined time elapses from receiving the connection signal. That is, after receiving the connection signal, the control unit 230 may wait for a time (a predetermined time) for receiving the request signal if the state of the connection detector 190 is normal. In addition, the control unit 230 may output the capacitance and the identification information through the communication unit 220 when the request signal is not received for a predetermined time.

At least some of the components of the battery pack 100 according to an embodiment of the present disclosure may be implemented by supplementing or adding functions of components included in a conventional BMS. For example, the communication part 160, the controller 170, the storage part 180, and the connection detector 190 of the battery pack 100 may be implemented as components of the BMS. In addition, such a BMS may be provided in the battery pack 100.

Figure 4:
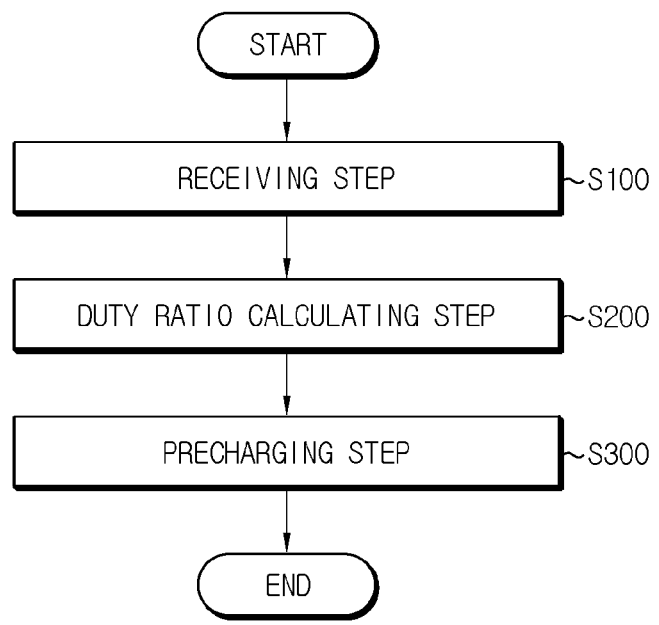
FIG. 4 is a diagram schematically showing a precharge method according to still another embodiment of the present disclosure.

FIG. 4 is a diagram schematically showing a precharge method according to still another embodiment of the present disclosure.

The precharge method may be applied to the battery pack 100 or the battery system 10 according to an embodiment of the present disclosure. Preferably, each step of the precharge method may be performed by the battery pack 100.

Referring to FIG. 4, the precharge method may include a receiving step (S100), a duty ratio calculating step (S200), and a precharging step (S300).

The receiving step (S100) is a step of receiving the capacitance of the capacitor 210 from the load 200 when the battery pack 100 and the load 200 are connected, and may be performed by communication part 160.

Preferably, when the battery pack 100 and the load 200 are connected, the communication part 160 may receive the identification information of the load 200 along with the capacitance from the load 200.

The duty ratio calculating step (S200) is a step of calculating a duty ratio corresponding to the capacitance, and may be performed by the controller 170.

The controller 170 may obtain the capacitance of the capacitor 210 provided in the load 200 through the communication part 160, and may calculate the duty ratio corresponding to the obtained capacitance. That is, the controller 170 may improve the accuracy of the precharge by directly calculating the duty ratio optimized for the load 200 before performing the precharge.

The precharging step (S300) is a step of precharging the capacitor 210 by controlling the operation state of the precharge relay 130 according to the calculated duty ratio, and may be performed by the controller 170.

For example, in the embodiment of FIG. 2, the controller 170 may control the operation state of the precharge relay 130 according to the calculated duty ratio. Through this, the capacitor 210 may be precharged.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery system
100: battery pack
110: battery cell
120: main relay
121: second main relay
130: precharge relay
140: precharge resistor
150: connector
160: communication part
170: controller
180: storage part
190: connection detector
200: load
210: capacitor
220: communication unit
230: control unit
240: connection detection unit

What is claimed is:

1. A battery pack, comprising:
a battery cell;
a main relay provided on a charging and discharging path of the battery cell;
a precharge relay;
a precharge resistor, the precharge relay and the precharge resistor being connected in parallel to the main relay on the charging and discharging path;
a connector connected to a load including a capacitor;
a communication part configured to receive a capacitance of the capacitor from the load through the connector, when the load is connected to the connector; and
a controller configured to:
obtain the capacitance from the communication part,
calculate a duty ratio corresponding to the capacitance, and precharge the capacitor by controlling an operation state of the precharge relay according to the calculated duty ratio.

2. The battery pack according to claim 1, further comprising:
a storage part configured to map and store identification information of the load and the capacitance,
wherein the communication part is configured to further receive the identification information together with the capacitance from the load.

3. The battery pack according to claim 2,
wherein the controller is further configured to:
obtain the identification information and the capacitance received by the communication part, and
determine whether to store the identification information and the obtained capacitance by comparing the obtained identification information with the identification information.

4. The battery pack according to claim 3,
wherein the controller is further configured to map and store the obtained identification information and the obtained capacitance in the storage part, when the obtained identification information is not stored in the storage part, and
wherein when the obtained identification information is stored in the storage part but the obtained capacitance is different from the capacitance stored in the storage part, the controller is further configured to update the stored capacitance to the obtained capacitance to correspond to the stored identification information.

5. The battery pack according to claim 1,
wherein the main relay is configured to have a first end connected to a first end of the battery cell and a second end connected to the connector,
wherein the precharge relay is configured to have a first end connected between a first end of the battery cell and a first end of the main relay on the charging and discharging path and a second end connected to a first end of the precharge resistor, and
wherein the precharge resistor is configured to have the first end connected to the second end of the precharge relay and a second end connected between the second end of the main relay and the connector on the charging and discharging path.

6. A battery system, comprising:
the battery pack according to claim 1; and
the load,
wherein the capacitor includes a first end connected to a positive electrode terminal of the battery pack and a second end connected to a negative electrode terminal of the battery pack, and
wherein the load further includes:
a communication unit communicatively connected to the communication part; and
a control unit configured to control the communication unit to output the capacitance of the capacitor and the identification information of the load to the communication part.

7. The battery system according to claim 6,
wherein the battery pack further comprises a connection detector configured to detect a connection between the load and the connector and output a connection detection signal when the connection between the load and the connector is detected, and
wherein the controller is further configured to output a request signal for requesting the capacitance of the capacitor and the identification information of the load to the communication unit through the communication part, when the connection detection signal is received from the connection detector.

8. The battery system according to claim 7,
wherein the control unit is further configured to:
receive the request signal through the communication unit,
generate a response signal including the identification information and the capacitance in response to the request signal, and
control the communication unit to output the response signal to the communication part.

9. The battery system according to claim 6,
wherein the load further includes a connection detection unit configured to detect a connection to the connector and output a connection signal to the control unit when the connection to the connector is detected, and
wherein the control unit is further configured to control the communication unit to output the capacitance and the identification information to the communication part, when the connection signal is received from the connection detection unit.

10. A precharge method of a battery pack including a battery cell, a main relay provided on a charging and discharging path of the battery cell, and a precharge relay and a precharge resistor connected in parallel to the main relay on the charging and discharging path and is configured to be connected to a load including a capacitor, the precharge method comprising:
a capacitance receiving step of receiving a capacitance of the capacitor from the load, when the battery pack and the load are connected;
a duty ratio calculating step of calculating a duty ratio corresponding to the capacitance; and
a precharging step of precharging the capacitor by controlling an operation state of the precharge relay according to the calculated duty ratio.

* * * * *